United States Patent [19]

Kay

[11] 4,451,761

[45] May 29, 1984

[54] GLASS COMPOSITION AND GAS-FILLED DISPLAY PANEL INCORPORATING THE GLASS AS AN INSULATING LAYER

[75] Inventor: Nicholas W. Kay, Mine Hill, N.J.

[73] Assignee: Burroughs Corporation, Detroit, Mich.

[21] Appl. No.: 339,117

[22] Filed: Jan. 13, 1982

[51] Int. Cl.³ .................. H01J 17/49; C03C 3/10;

[52] U.S. Cl. ........................... 313/586; 501/76
[58] Field of Search ............... 313/636, 493, 480, 586

[56] References Cited

U.S. PATENT DOCUMENTS 4,114,064  9/1978  Ernsthausen ..................... 313/586
4,179,638  12/1979  Boyd et al. ....................... 313/480

4,315,259  2/1982  McKee et al. ..................... 313/584

FOREIGN PATENT DOCUMENTS 2445713   6/1975  Fed. Rep. of Germany ........ 501/76
49-44563  11/1974  Japan .................................. 501/76
52-28546   4/1977  Japan ................................ 315/586

Primary Examiner—Palmer C. Demeo
Assistant Examiner—Sandra L. O'Shea
Attorney, Agent, or Firm—Kevin R. Peterson; Robert A. Green; David G. Rasmussen

[57] ABSTRACT

The disclosure is of a glass composition including PbO, $SiO_2$, $B_2O_3$, BaO, ZnO, $Al_2O_3$ and $Na_2O$. The glass is used as an insulating layer in gas-filled display panels including an electrode which is insulated from the gas therein.

6 Claims, 2 Drawing Figures

GLASS COMPOSITION AND GAS-FILLED DISPLAY PANEL INCORPORATING THE GLASS AS AN INSULATING LAYER

BACKGROUND OF THE INVENTION

Gas-filled display devices have come into wide use, and these devices are generally of three types, D.C. devices, A.C. devices, and quasi A.C. devices. In D.C. devices, the panel electrodes are disposed within the gas filling of the panel; in A.C. devices, all of the electrodes are insulated from the gas filling by a glass coating; and, in quasi A.C. devices, there is a combination of electrodes both in contact with and insulated from the gas filling by means of a glass coating formed thereon. When devices of the A.C. and quasi A.C. types are engineered, various factors including the various thermal coefficients of expansion must be taken into account, and, in selecting glasses for coatings, factors to consider are the thermal coefficient of expansion, light transmissivity, and softening temperature.

A gas-filled display panel of the quasi-A.C. type, having memory is disclosed in copending application Ser. No. 051,313, filed June 22, 1979, of George E. Holz and James A. Ogle. This panel presents problems with respect to the glass required for coating the electrodes, and no completely suitable glass is known and available. The present invention provides such a composition of a glass.

DESCRIPTION OF THE INVENTION

Figure 1:
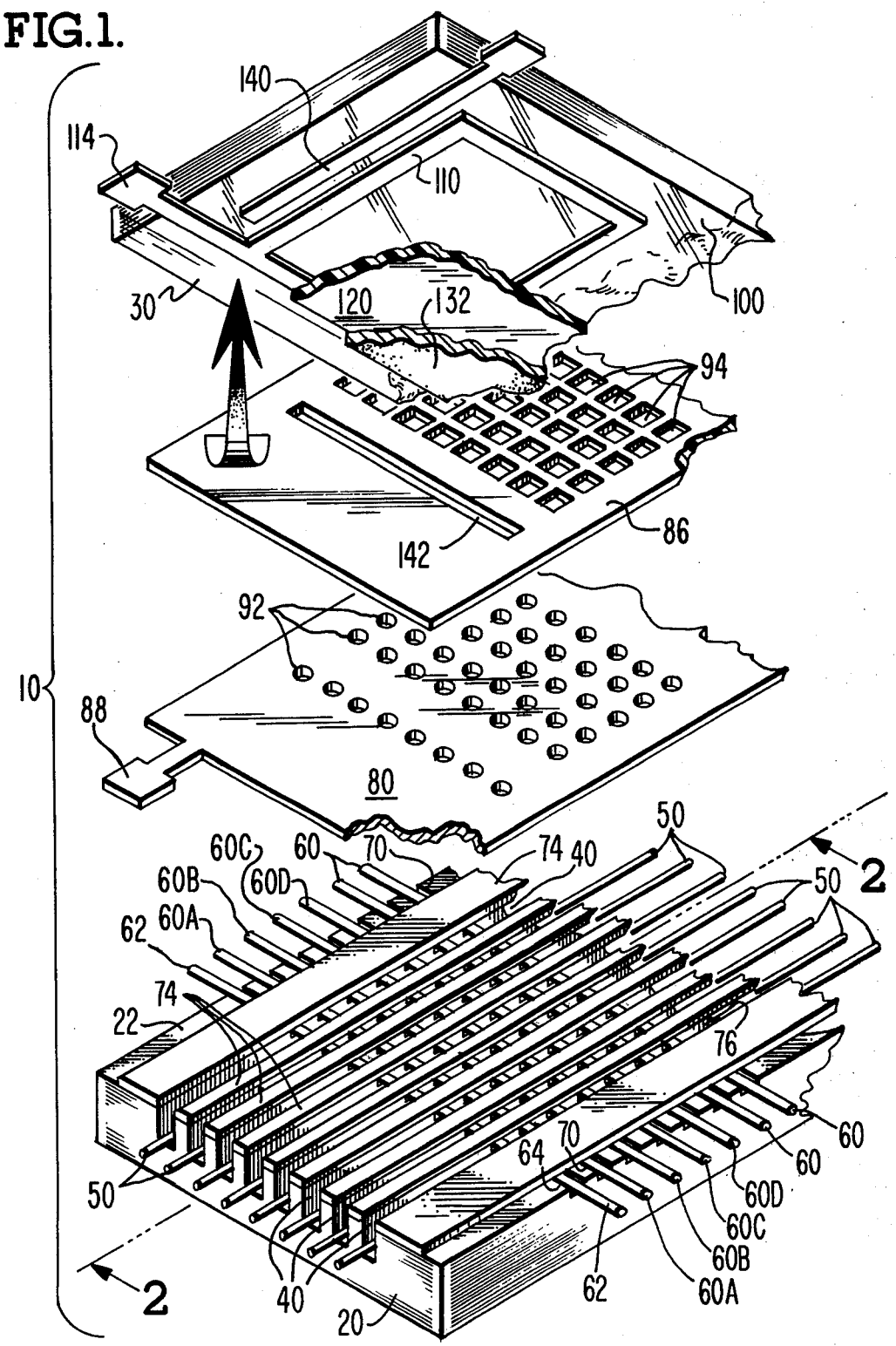
FIG. 1 is a perspective exploded view of a display panel operated according to the invention.

One type of display panel 10 in which a glass composition embodying the invention may be used is described in application Ser. No. 051,313 of George E. Holz and James A. Ogle and includes a gas-filled envelope made up of an insulating base plate or substrate 20 and a glass face plate 30, which is shown tilted up and to the left in FIG. 1 to present a view of its inner surface. These plate, which are usually of soda-lime glass, are hermetically sealed together along their aligned perimeters to form the panel envelope which encloses the various gas-filled cells and operating electrodes of the panel. The base plate has a top surface 22 in which a plurality of relatively deep parallel slots 40 are formed and in each of which a scan/address anode electrode, for example a wire 50, is seated and secured.

Figure 2:
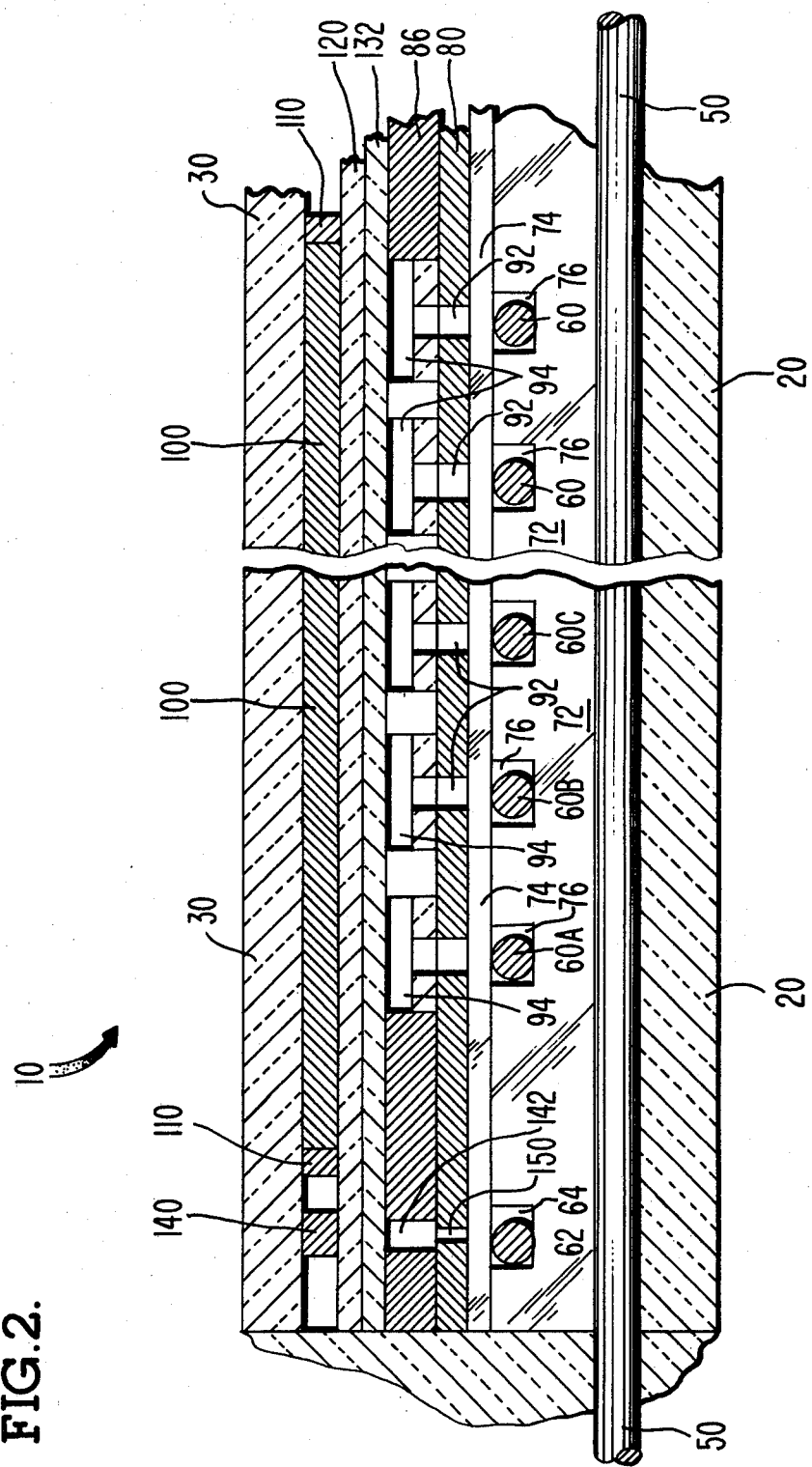
FIG. 2 is a sectional view through the panel of FIG. 1 along lines 2—2, with the panel shown assembled.

A plurality of scan cathode electrodes in the form of wires 60 are seated in relatively shallow slots 70 in the top surface 22 of the base plate. The slots 70 and scan cathodes 60 are disposed transverse to the slots 40 and scan anodes 50, and each crossing of a scan cathode 60 and a scan anode 50 defines a scanning cell 72 (FIG. 2). It can be seen that the anodes 50 and cathodes 60 form scanning cells which are arrayed in rows and columns.

The scan cathodes 60A, B, C, etc., form a series of cathodes which are energized sequentially in a scanning cycle, with cathode 60A being the first cahode energized in the scanning cycle.

A reset cathode 62 is disposed in a slot 64 in the top surface of the base plate adjacent to the first scan cathode 60A. Where the reset cathode crosses each scan anode 50, a reset cell is formed, and the crossing of all of the scan anodes by the reset cathode provides a column of reset cells. These reset cells are turned on or energized at the beginning of each scanning cycle, and they generate excited particles which expedite the turn-on of the first column of scanning cells associated with cathode 60A.

In the panel 10, a spacer sheet comprising strips 74 of insulating material, such as glass, is provided on the top surface of the base plate 20 and on cathodes 60 and 62 so that the cathodes are spaced uniformly from an electrode plate 80 disposed above them, as described below. The strips 74 are disposed across the cathodes 60 which are thus separated into discrete operating portions.

Adjacent to the base plate assembly described above, is a quasi A.C. assembly which includes the electrode 80 which is in the form of a thin metal plate having an array of rows and columns of relatively small apertures 92, each overlying one of the scanning cells. The plate 80 is in contact with the gas in the panel and is positioned close to cathodes 60 and may be seated on insulating sheet or layer 74. Adjacent to plate 80, and preferably in contact with the upper surface thereof, is an apertured plate or sheet 86 having rows and columns of apertures 94 which are larger than apertures 92. The apertures 94 comprise the display cells of panel 10. The sheet 86 may be of insulating material, or it may be of metal. Plate 80 is provided with a conductive tab 88, to which external contact can be made.

The quasi A.C. assembly also includes a face plate assembly which comprises a large-area transparent electrode 100 on the inner surface of plate 30. A narrow conductor 110 outlines and reinforces the electrode layer 100 and serves to increase its conductivity. The conductor 110 includes a conductive tab 114, to which external connection can be made. An insulating transparent coating 120 of a vitreous glass embodying the invention covers electrode 100, and, if desired, a dielectric layer 132 of magnesium oxide, thorium oxide, or the like is provided on glass layer 120.

The panel 10 includes a keep-alive mechanism comprising an A.C. electrode 140 on the inner surface of the face plate and aligned with a slot 142 in plate 86 and with apertures 150 in plate 80. The keep-alive action is provided by electrode 140 and electrode plate 80.

The gas filling in panel 10 is preferably a Penning gas mixture of, for example, neon and a small percentage of xenon, at a pressure of about 400 Torr.

According to the invention, the composition of layer 120 provides a glass which closely matches the thermal coefficient of expansion of soda-lime glass and possesses a dielectric constant of at least 9 or higher. This material also has 85% or better light transmissivity when fired on a soda-lime glass substrate. In addition to the above-mentioned characteristics, the glass can withstand sealing temperatures up to 490° C. with no sign of softening and can be fired up to about 600° C. without distortion of the soda-lime substrate.

This glass consists of a blend of glass-forming oxides as follows:

| Component | % By Weight |
| --- | --- |
| PbO | 52 |
| $SiO_2$ | 16 |
| $B_2O_3$ | 13 |
| BaO | 12 |
| ZnO | 5.5 |
| $Al_2O_3$ | 2.5 |

-continued

| Component | % By Weight |
|---|---|
| Na$_2$O | 1.0 |

In addition, the materials may be provided in approximate ranges as set forth below:

| Component | Range in % by Weight |
|---|---|
| PbO | 51–55 |
| SiO$_2$ | 12–16 |
| B$_2$O$_3$ | 10–15 |
| BaO | 8–12 |
| ZnO | 0–4 |
| Al$_2$O$_3$ | 0.5–2.5 |
| Na$_2$O | 0.5–2.0 |

It is noted that the glass sheet formed by the glass composition of the invention can be used in other devices than the panel 10 described above.

What is claimed is:

1. A glass composition including PbO, SiO$_2$, B$_2$O$_3$, BaO, ZnO, Al$_2$O$_3$, and Na$_2$O, said glass composition, when fired on a soda-lime substrate, forming a glass layer having a thermal coefficient of expansion similar to that of soda-lime glass, a dielectric constant of at least 9, light transmissivity of at least 85%, and heatable to about 600° C. without distortion of the soda-lime substrate.

2. A glass composition including PbO in the range of 51 to 55 percent by weight, SiO$_2$ in the range of 12 to 16 percent by weight, B$_2$O$_3$ in the range of 10 to 15 percent by weight, BaO in the range of 8 to 12 percent by weight, ZnO in the range of 0 to 4 percent by weight, Al$_2$O$_3$ in the range of 0.5 to 2.5 percent by weight, and Na$_2$O in the range of 0.5 to 2.0 percent by weight, said glass composition, when fired on a soda-lime substrate, forming a glass layer having a thermal coefficient of expansion similar to that of soda-lime glass, a dielectric constant of at least 9, light transmissivity of at least 85%, and heatable to about 600° C. without distortion of the soda-lime substrate.

3. A glass composition including 52% by weight of PbO, 16% by weight of SiO$_2$, 13% by weight of B$_2$O$_3$, 12% by weight of BaO, 5.5% by weight of ZnO, 2.5% by weight of Al$_2$O$_3$, and 1.0% by weight of Na$_2$O, said glass composition, when fired on a soda-lime substrate, forming a glass layer having a thermal coefficient of expansion similar to that of soda-lime glass, a dielectric constant of at least 9, light transmissivity of at least 85%, and heatable to about 600° C. without distortion of the soda-lime substrate.

4. A display panel comprising
a gas-filled envelope,
said envelope being made up of a base plate and a face plate sealed together hermetically, said face plate comprising a soda-lime glass,
an array of rows and columns of scanning cells associated with said base plate and including an array of scan anodes and scan cathodes disposed at an angle to each other,
an array of rows and columns of display cells disposed adjacent to said scanning cells and in operative relation therewith,
said display cells being defined by an apertured plate electrode and a large-area transparent electrode disposed on said face plate and covered with a layer of insulating glass, said insulating glass being compatible with soda-lime glass and being made from a glass composition including PbO in the range of 51 to 55 percent by weight, SiO$_2$ in the range of 12 to 16 percent by weight, B$_2$O$_3$ in the range of 10 to 15 percent by weight, BaO in the range of 8 to 12 percent by weight, ZnO in the range of 0 to 4 percent by weight, Al$_2$O$_3$ in the range of 0.5 to 2.5 percent by weight, and Na$_2$O in the range of 0.5 to 2.0 percent by weight.

5. The panel defined in claim 4 wherein said insulating glass is made from a glass composition including 52% by weight of PbO, 16% by weight of SiO$_2$, 13% by weight of B$_2$O$_3$, 12% by weight of BaO, 5.5% by weight of ZnO, 2.5% by weight of Al$_2$O$_3$, and 1.0% by weight of Na$_2$O.

6. A gas-filled display panel including
a gas-tight envelope made up of a soda-lime base plate and a soda-lime face plate and containing an ionizable gas,
a plurality of D.C. cells adjacent to said base plate, each cell including a quantity of gas filling of the panel, and
an A.C. electrode formed on said face plate and insulated from the gas filling of the panel by a layer of glass formed from a glass mixture having a composition comprising PbO in the range of 51 to 55 percent by weight, SiO$_2$ in the range of 12 to 16 percent by weight, B$_2$O$_3$ in the range of 10 to 15 percent by weight, BaO in the range of 8 to 12 percent by weight, ZnO in the range of 0 to 4 percent by weight, Al$_2$O$_3$ in the range of 0.5 to 2.5 percent by weight, and Na$_2$O in the range of 0.5 to 2.0 percent by weight, said layer of glass having a thermal coefficient of expansion similar to that of soda-lime glass, a dielectric constant of at least 9, light transmissivity of at least 85%, and heatable to about 600° C. without distortion of the soda-lime base plate.

* * * * *